United States Patent
Ha et al.

(10) Patent No.: US 11,182,473 B1
(45) Date of Patent: Nov. 23, 2021

(54) SYSTEM AND METHOD FOR MITIGATING CYBERATTACKS AGAINST PROCESSOR OPERABILITY BY A GUEST PROCESS

(71) Applicant: FireEye, Inc., Milpitas, CA (US)

(72) Inventors: Phung-Te Ha, Dublin, CA (US); Min Li, Hangzhou (CN)

(73) Assignee: FireEye Security Holdings US LLC, Milpitas, CA (US)

( * ) Notice: Subject to any disclaimer, the term of this patent is extended or adjusted under 35 U.S.C. 154(b) by 244 days.

(21) Appl. No.: 16/130,944

(22) Filed: Sep. 13, 2018

(51) Int. Cl.
| | |
|---|---|
| G06F 21/00 | (2013.01) |
| G06F 21/53 | (2013.01) |
| G06F 21/55 | (2013.01) |
| G06F 21/56 | (2013.01) |
| G06F 9/455 | (2018.01) |
| G06F 9/48 | (2006.01) |

(52) U.S. Cl.
CPC .......... *G06F 21/53* (2013.01); *G06F 9/45558* (2013.01); *G06F 9/4856* (2013.01); *G06F 21/554* (2013.01); *G06F 21/566* (2013.01); *G06F 2009/45587* (2013.01); *G06F 2009/45591* (2013.01)

(58) Field of Classification Search
CPC .... G06F 21/53; G06F 9/45558; G06F 9/4856; G06F 21/566; G06F 21/554
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Mining Specification of Malicious Behavior"—Jha et al., UCSB, Sep. 2007 https://www.cs.ucsb.edu/.about.chris/research/doc/esec07.sub.--mining.pdf-.

(Continued)

*Primary Examiner* — Tri M Tran
(74) *Attorney, Agent, or Firm* — Rutan & Tucker, LLP

(57) ABSTRACT

According to one embodiment of the disclosure, a method for reassigning execution of certain instructions directed to a speculative execution task or a reserved instruction, attempted by a guess process, to be handled by a host process is described herein. The method involves detecting whether a software component, operating within a virtual machine deployed within a guest environment of the network device, is attempting to execute an instruction associated with a speculative execution task. If so, the speculative execution task is prevented from being performed by the software component without the virtual machine detecting that speculative execution by the software component has been reassigned.

22 Claims, 5 Drawing Sheets

(56) References Cited

U.S. PATENT DOCUMENTS

| | | |
|---|---|---|
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,176,488 B1 * | 5/2012 | Dobrovolskiy ..... G06F 11/3644 718/1 |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |

(56) References Cited

U.S. PATENT DOCUMENTS

| | | |
|---|---|---|
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |

(56) References Cited

U.S. PATENT DOCUMENTS

| | | |
|---|---|---|
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 * | 2/2019 | Steinberg ............ G06F 9/45558 |
| 10,218,740 B1 | 2/2019 | Mesdaq et al. |
| 10,242,185 B1 | 3/2019 | Goradia |
| 10,698,668 B1 * | 6/2020 | Pohlack .................... G06F 8/44 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |

(56) References Cited

U.S. PATENT DOCUMENTS

| | | |
|---|---|---|
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |

(56) References Cited

U.S. PATENT DOCUMENTS

| | | |
|---|---|---|
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0053272 A1* | 2/2014 | Lukacs ............... G06F 21/53 726/24 |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.sp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

(56) References Cited

OTHER PUBLICATIONS

Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

* cited by examiner

SYSTEM AND METHOD FOR MITIGATING CYBERATTACKS AGAINST PROCESSOR OPERABILITY BY A GUEST PROCESS

1. FIELD

Embodiments of the disclosure relate to the field of cyber security. More specifically, embodiments of the disclosure relate to a system and computerized method that mitigates cyberattacks against processor operability, including speculative execution.

2. GENERAL BACKGROUND

Malware detection systems often employ a software architecture with a virtualized representation that includes a guest environment (sometimes referred to as "guest space") and a host environment (sometimes referred to as "host space") Each environment may be configured in accordance with different privilege levels. For example, the host environment may feature a protection ring architecture that is arranged with a privilege hierarchy from the most privileged level (host kernel space, Ring-0) to a lesser privilege level (host user space, Ring-3). Similarly, the guest environment may be arranged with a privilege hierarchy from the most privileged level (guest kernel space, Ring-0) to a lesser privilege level (guest user space, Ring-3). One or more virtual machines may be executed as part of the guest, environment.

The virtual memory associated with both the guest and host environments can be logically allocated into two distinct regions, namely, the user space and the kernel space. The user space is a prescribed memory area that may be used for running processes resulting from the execution of application software and/or certain drivers. Within the user space, guest user processes may be executed within a virtual machine while host user processes may be executed by certain drivers or operating system (OS) components. In contrast, the kernel space is commonly reserved for running the most privileged processes, including a guest [OS] kernel associated with the virtual machine and a host kernel (e.g., hypervisor) that manages operability of the guest kernel for each virtual machine operating within the guest environment.

Given this memory allocation, code associated with the kernel space is usually loaded into a separate area of memory, which is protected from access by application programs operating within the user space. Hence, it is crucial for modern computing devices to isolate processes operating in the user space from processes operating in the kernel space, where this separation prevents processes in the user space and in the host space from interfering with each other and compromising computing device security. Also, to protect code associated with the user space, each guest user process of application programs within the user space are isolated from each other as well as guest user processes for other application programs.

Recently, some cyberattacks, such as the MELTDOWN attack, are being conducted in an attempt to contravene the user space and kernel space separation so that a malicious guest process may gain access to host kernel operability. Additionally, other cyberattacks, such as the SPECTRE attack, are being conducted in an attempt to contravene inter-process isolation of user space applications. Hence, some of these cyberattacks involve malware that takes advantage of the inadequate checks directed to speculative execution, where the malware redirects speculative execution operations to certain memory locations from which data may be extracted to obtain host kernel data, certain memory locations from which data associated with other guest applications may be extracted, or the like.

A proposed solution to address the speculative execution vulnerabilities, for example, would include prevention of speculative execution capabilities conducted by processors. However, the prevention of speculative execution would significantly reduce the operating speed of such computing devices, which would significantly affect their overall performance.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
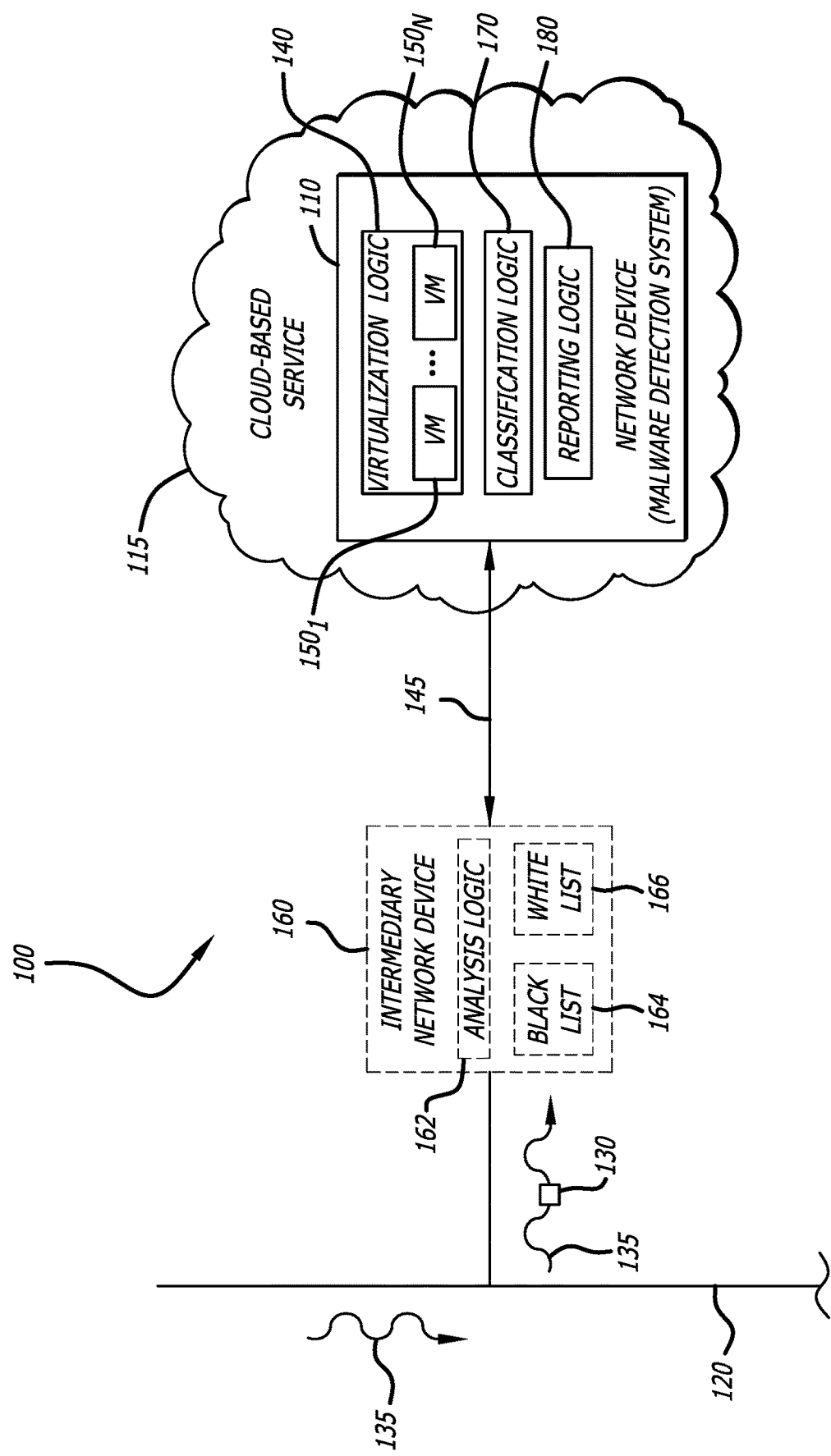
FIG. 1 is an exemplary block diagram of a cyberattack detection system including a network device deploying a malware detection system.

Various embodiments of the disclosure relate to a malware detection system configured to prevent a guest process, running in a virtual machine, from performing certain activities that are considered, with a higher likelihood than other activities, to be associated with a cyberattack on processor functionality. The guest process performance change is conducted to achieve some or all of the following objectives: (1) maintain operating speed of the malware detection system through the use of speculative execution, especially given the strict time constraints applied for analysis of an object, in order to detect, correlate and/or classify behaviors to determine a potential cyberattack; (2) prevent malware from infiltrating components outside the guest environment, such as components of the underlying host environment, to compromise the malware detection system; and/or (3) perform malware detection in a manner that hides, or at least obfuscates from the guest process the performance of such detection so that the malware continues operation and refrains from performing any aggressive counter detection operations.

To accomplish the objective(s), a guest process is prevented from performing these activities by reassigning control in the performance of such activities to a host process, where the reassignment occurs unbeknownst to the guest process. For example, these activities may be identified during execution by a guest user process as (i) one or more instructions associated with a speculative execution task (hereinafter, "SE instructions") or (ii) one or more instructions that are selectively reserved for host processes, not guest processes (hereinafter, "reserved instructions").

According to one embodiment of the disclosure, the reserved instructions may include a first subset of reserved instruction, referred to as "default" reserved instructions, which are non-programmable (static) instructions to be executed within the host environment (e.g., hard coded instructions, etc.). The default instructions are a subset of instructions where strict host environment processing is warranted. The reserved instructions may further include a second subset of instructions, which are "programmable" instructions executed within the host environment that may be altered periodically or aperiodically by the hypervisor while the processor is in the "host mode." These programmable instructions are selected by the hypervisor at initialization based on a desired amount of control in operability of the network device as desired by an analysis. The particular SE and reserved instructions associated with these activities may be loaded by a processor of the malware detection system at initialization and/or during run-time when the processor is operating in "host mode" (executing code stored within the host environment) in lieu of operating in "guest mode" (executing code stored within the guest environment).

According to one embodiment of the disclosure, the malware detection system (MDS) may be implemented, in some embodiments, on a network device operating as a security appliance. The network device is communicatively coupled to a private or public network to receive and analyze objects, included as part of network traffic, for maliciousness in a virtualized run-time environment (sandbox) utilized by the MDS. The network device includes a processor and a data store accessible by the processor.

As described below, the data store operates as local memory for the processor (e.g., cache memory, dedicated memory, etc.). For this embodiment of the disclosure, the data store includes a first set of instructions (e.g., SE instructions) that, upon the processor detecting a guest user process is attempting to execute one of the stored SE instructions, causes the processor to temporarily reassign control in the execution of the SE instruction from the guest user process. Rather, a controller operating within a host user space is assigned to control emulation of the execution of the SE instruction by a targeted (emulated) network device. In particular, the SE instruction is moved from the guest instruction stack to the host instruction stack for processing (e.g., emulation) by the controller along with the controller obtaining the state of a guest (e.g., a virtual machine) associated with this guest user process. Based on the particular SE instruction, the controller may be configured to emulate processing of that particular SE instruction to determine the results of such processing Besides the first set of instructions, the data store may further include a second set of instructions (e.g., reserved instructions). The reserved instructions may include (i) a first subset of instructions (hereinafter, "default instructions") and (ii) a second subset of instructions (hereinafter, "programmable instructions"). The default instructions are static (e.g., hardcoded) instructions that are associated with a certain privilege or importance to exclude any processing of the instruction in the guest environment. The programmable instructions, however, are instructions that selectively adjust the amount of control of instructions to be undertaken by the host environment. The selection of the instructions is based on coding of the hypervisor, where the coding may be conducted to address particular threat(s) that can be identified as commencing with a particular instruction (or series of instructions). The selection of the programmable instructions occurs at initialization of the hypervisor and prior to switches of the processor from host mode to guest mode. Upon detection of an attempted execution of these a reserved instructions by a guest process, a transfer of control, from the guest user process to the controller, is conducted as described below.

The above-described malware detection system mechanism is adapted to detect cyberattacks that contravene user space and kernel space (hereinafter, "user/kernel space") separation. Additionally, or in the alternative, the above-described malware detection system mechanism is further adapted to detect cyberattacks that contravene inter-process isolation of user space applications.

More specifically, according to one embodiment of the disclosure, the virtualized run-time environment of the MDS features a guest environment and a host environment. The guest environment includes one or more virtual machines (each virtual machine "VM" sometimes referred to as a "guest") for analyzing the received objects. The host environment controls operability of the virtual machine(s) and connectivity to the physical hardware devices. The host environment includes a controller, operating in the host user space, to specifically handle operations targeted to remove execution control from a guest (e.g., a guest user process operating in a virtual machine). As an illustrative example, a guest user process may conduct a task that utilizes speculative execution.

A guest user process operates within the virtual machine in accordance with instructions placed within a guest instruction stack associated with that virtual machine. During these operations, the processor is considered to operate in "guest" mode. During guest mode, the processor is provided access to the next instruction for execution originating from the guest (e.g., virtual machine) associate with the virtualized run-time environment of the MDS. Prior to execution of the instruction, the processor accesses the data store and determines whether the instruction is a SE instruction (e.g., one of the first set of instructions) or a reserved instruction (e.g., one of the second set of instructions). If the instruction is not one of the first or second set of instructions, the guest process retains operational control of the network device and its resources while the processor operates in "guest" mode.

In contrast, if the instruction is a SE instruction, the processor temporarily reassigns control in the processing of the SE instruction. For this embodiment, a controller operating within a host user space is assigned control to emulate execution of the SE instruction by a targeted network device. At this time, upon detection of the SE instruction, the processor transitions from "guest" mode to "host" mode. In host mode, the processor passes the SE instruction to the controller for processing. Additionally, the controller receives a stored current state of the guest (VM). Based on the received SE instruction and the stored current state of the VM, the controller determines what information to return to the guest (e.g., virtual machine). Through such operations, SE instruction is handled, albeit it is not handled in the guest mode. This achieves the above-identified objectives in maintaining speed of operation through the use of speculative execution while protect the underlying host environment of the malware detection system from compromise, unbeknownst to the guest process.

For example, where the SE instruction corresponds to writing data to an Intel®-based register architecture (e.g., MSR register), the controller may appear to alter the MSR register, although the MSR register remains unchanged. Rather the controller stores the intended (changed) value of the MSR register as part of the state information associated with the VM and returns the intended value (or signals that the data has been written to the MSR register). However, the actual MSR register remain unchanged. Therefore, by confining execution of instructions causing or leading to a speculative execution task to be conducted by a software component within the host environment and appearing to support a SE-enabled guest user process in operation, the MDS may avoid malware, being executed by the guest process, from discovering that it is operating in a virtualized run-time environment configured for malware detection and performing evasive tactics to complicate its detection (e.g., shutdown, etc.). As a result, the MDS may be privy to future behaviors by the malware to provide better context surrounding the malware (e.g., type, family, intent, etc.).

If the instruction is a reserved instruction, as similarly described above with respect to a SE instruction, the processor assigns control to emulate execution of the reserved instruction by a targeted network in execution of the reserved instruction to the controller located in the host user space. The controller receives the reserved instruction and the current state of the guest (VM). Based on the reserved instruction and the current state of the VM, the controller determines what information is to be returned to the guest (e.g., virtual machine). Herein, the returned information may cause the VM to conclude that it is operating in a different state, as identified by the information returned to the guest, than its actual state.

In summary, the virtualized run-time environment of the MDS is configured to reassign the execution of certain instructions (e.g., change control flow), which may cause (or lead to) a speculative execution operation and/or certain reserved instructions, which are to be executed by software components within the guest environment, to be handled via emulation by software components operating within the host environment. This reassignment allows for speculative execution to be performed by a host process without the guest detecting that the execution of the SE instruction(s) or reserve instruction(s) has been reassigned to a host process.

I. Terminology

In the following description, certain terminology is used to describe aspects of the invention. For example, in certain situations, the terms "component" and "logic" are representative of hardware, firmware and/or software that is configured to perform one or more functions. As hardware, a component (or logic) may include circuitry having data processing or storage functionality. Examples of such processing or storage circuitry may include, but is not limited or restricted to the following: a processor; one or more processor cores; a programmable gate array; an I/O controller (network, disk, keyboard, etc.); an application specific integrated circuit; receiver, transmitter and/or transceiver circuitry; semiconductor memory; combinatorial logic, or combinations of one or more of the above components.

A component (or logic) may be in the form of one or more software modules, such as executable code in the form of an operating system, an executable application, code representing a hardware I/O component, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or portable memory device; and/or a semiconductor memory. As firmware, the executable code is stored in persistent storage.

The term "object" generally refers to a collection of data, whether in transit (e.g., over a network) or at rest (e.g., stored), often having a logical structure or organization that enables it to be classified for purposes of analysis. According to one embodiment, the object may include one or more communications packets. According to another embodiment, the object may be extracted from payloads of one or more communication packets. According to yet another embodiment, the object may be a document, file, executable, uniform resource locator (URL) or other data type embedded within or formed by the one or more communication packets. During analysis, for example, the object may exhibit a set of behaviors, some of which may be expected and others may be unexpected. The set of behaviors (or the unexpected behavior(s) themselves) may be systematic of the object being associated with a cyberattack or associated with malicious activity, such as the object including malware.

In general, a "virtual machine" generally refers to a virtualized network device that includes an operating system (OS) and one or more applications that operate with virtualized device hardware. The virtualized device hardware may be different from the physical device hardware on which the virtualization is conducted. Virtual machines may be provisioned with one or more OSes, applications, and I/O controllers that are intended to present to potential malware resident in an object under analysis.

A "network device" generally refers to an electronic device with network connectivity. Examples of a network device may include, but are not limited or restricted to the following: a server; a router or other signal propagation networking equipment (e.g., a wireless or wired access point); an endpoint device (e.g., a stationary or portable computer including a desktop computer, laptop, electronic reader, netbook or tablet; a smart phone; a video-game console); or wearable technology (e.g., watch phone, etc.). The term "computerized" generally represents that any corresponding operations are conducted by hardware in combination with software and/or firmware.

The term "transmission medium" (or "interconnect") is a physical or logical communication path to or within a network device. For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

Lastly, the terms "or" and "and/or" as used herein are to be interpreted as inclusive or meaning any one or any combination. Therefore, "A, B or C", "A; B; or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and is not intended to limit the invention to the specific embodiments shown and described.

II. General Architecture

Referring to FIG. 1, an exemplary block diagram of a cyberattack detection system 100 including a network device 110 operating as a malware detection system (MDS) is shown. According to one embodiment, as shown, the MDS 110 may be deployed as part of a public or private cloud-based service 115, which may receive content for analysis (e.g., objects, representative data associated with an object, etc.). Alternatively, the MDS 110 may be deployed on-premises and communicatively coupled to a network 120 to analyze network traffic or the MDS 110 may be deployed remotely therefrom.

Herein, a cyberattack may be conducted by delivery of an object 130 with network traffic 135 propagating over the protected network 120, which may include a public network such as the Internet, a private network (e.g., a local area network "LAN", wireless LAN, etc.), or a combination thereof. According to one embodiment of the disclosure, the MDS 110 is configured to conduct a behavioral analysis of the object 130, which may involve processing of the object 130 within a virtual environment 275 (see FIG. 2). Herein, the processing may be conducted by one or more virtual machines (VMs) $150_1$-$150_N$ (N≥1) being part of the virtualization logic 140, which executes the object 130 and monitors the behaviors of the object 130 during execution. In an alternative embodiment, although not shown, the processing may be conducted by a software agent, which executes (or assists in the execution) of the object 130 and participates in the behavioral analysis of the object 130 during execution and outside of a virtual environment.

As an optional deployment for the cyberattack detection system 100 as represented by dashed lines, prior to analysis by the MDS 110, an intermediary network device 160 may be configured to intercept the network traffic 135 and extract the object 130 for analysis by the MDS 110. Additionally, for this embodiment of the disclosure, the intermediary network device 160 may conduct a preliminary analysis on the object 130 to determine whether the object 130 is "suspicious" (e.g., the object 130 exceeds a prescribed likelihood of being associated with a cyberattack). If determined to be "suspicious," the object 130 may undergo a further (more-detailed) analysis by the MDS 110 to assist in classifying the object as malicious or not.

More specifically, this preliminary analysis may involve analysis logic 162 conducting a correlation between (i) data associated with the object 130 (e.g., data included as part of the object 130, metadata accompanying the object 130, a hash value of at least a portion of the object 130 or data associated with the object 130, etc.) and (ii) contents from a black list 164 (e.g., data associated with objects previously determined to be malicious) and/or a white list 166 (e.g., data associated with objects previously determined to be benign). The object 130 is determined to be suspicious if the data related to the object 130 fails to match contents within either the black list 164 or the white list 166. The black list 164 and/or white list 166 may be maintained in local storage within the intermediary network device 160, as shown. Alternatively, the black list 164 and/or white list 166 may be periodically fetched from a remote source (not shown).

Additionally, or in the alternative, the analysis logic 162 deployed within the intermediary network device 160 may conduct a signature check analysis and/or a heuristic analysis. The signature check analysis may involve conducting a correlation between at least a portion of the data related to the object 130 (or hash value of such data) to one or more signatures (pre-configured and predetermined attack patterns). The signatures may be accessible from a signature database situated local to the intermediary network device 160. The heuristic analysis may be a rule-based or policy-based analysis of the object 130 in determining whether one or more portions of the object under analysis is associated with a suspicious feature. Hence, the object 130 may be considered "suspicious" based on the number and/or type of suspicious features determined during the heuristic analysis.

Referring still to FIG. 1, the MDS 110 includes the one or more VMs $150_1$-$150_N$ that may conduct a behavioral analysis on the object 130. More specifically, during execution of the object 130, the behaviors associated with operations of the object 130 and/or operations by one or more virtual machines (e.g., VM $150_1$) are monitored. Based at least in part of the monitored behaviors, classification logic 170 of the MDS 110 classifies the object 130 as malicious or non-malicious. Reporting logic 180 is deployed within the MDS 110 to (i) transmit a message to an administrator of the network 120 identifying a cyberattack is occurring or particulars associated with the object 130 deemed to be malicious and/or (ii) alter displayable content to highlight the maliciousness or non-maliciousness of the object 130. The message may be returned to a network device associated with the administrator via the intermediary network device 160 or the message may be transmitted through another communication path. For instance, the message may be sent via network interface controller $250_1$ (see FIG. 2).

As described below, instructions performed by guest user processes operating within a virtual machine (e.g. VMs $150_1$) may be detected and correlated with known speculative execution (SE) instructions and/or reserved instructions. The known SE instructions and/or reserved instructions, which are selected by the hypervisor at initialization and coded in response to received information concerning the current threat landscape, if handled by a guest user process, may expose physical hardware within the MDS 110 (e.g., processor, etc.) to potential cybersecurity threats.

Figure 2:
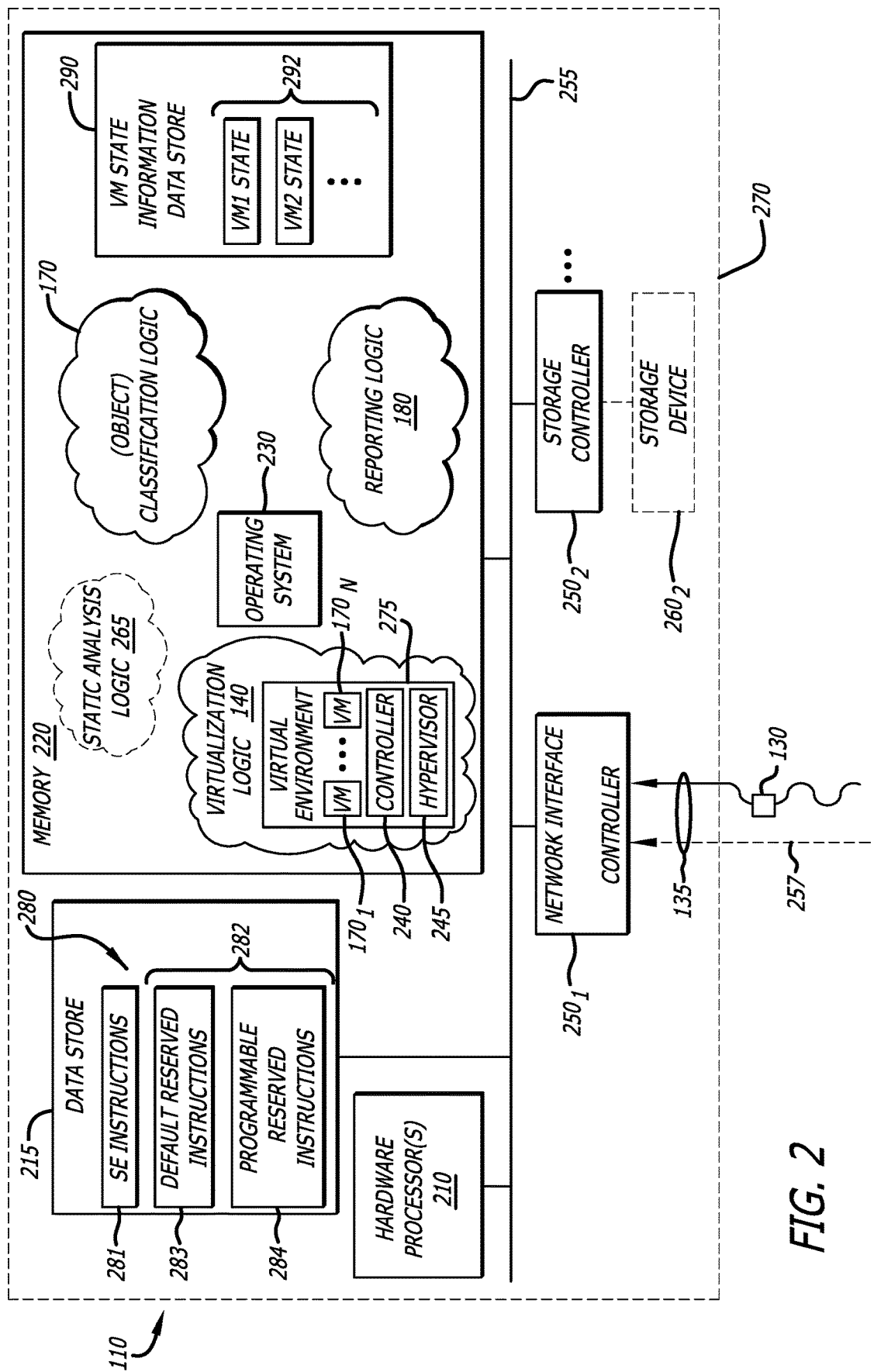
FIG. 2 is an exemplary block diagram of the network device including the malware detection system of FIG. 1.

Referring now to FIG. 2, an exemplary block diagram of the architecture of the MDS 110 of FIG. 1 is shown. Herein, according to one embodiment of the disclosure, the MDS 110 comprises a hardware processor 210 including a local data store 215, a memory 220 including virtualization logic 140 including the VM(s) $150_1$-$150_N$, an operating system (OS) 230, a controller 240 configured to specifically handle operations targeted to remove control in the execution of certain instructions from a guest (e.g., a guest process operating in the VM(s) $150_1$-$150_N$), and one or more input/output (I/O) controllers $250_1$-$250_M$ (M≥1) communicatively coupled to an interconnect 255 (e.g., bus).

As an illustrative embodiment, one type of I/O controller may correspond to a network interface controller $250_1$ that supports communications by the MDS 110 with the network 120, potentially via the intermediary device 160, for receipt of a portion of the network traffic 135 including the object 130. It is contemplated that the portion of network traffic 135 may include metadata 257 associated with the object 130. The metadata 257 may be provided before submission of the object 130 or may accompany the object 130 at the time of submission to the MDS 110. According to one embodiment of the disclosure, the metadata 257 may be used, at least in part, to determine protocols, application types and other information that identifies features of the object 130 under analysis. The metadata 257 may be used by the virtualization logic 140, such as a hypervisor 245 for example, to select one or more of the VM(s) $150_1$-$150_N$ to activate and which software profile is selected for each active VM $150_1$ . . . and/or $150_N$ of the virtualization logic 140.

Another type of I/O controller may correspond to a storage controller $250_2$ that operates as an interface between the interconnect 255 and a storage device 260, which may store the SE instructions or reserved instructions that are loaded into the data store 215 during initialization and an update cycle. The storage device 260 may be implemented as a local drive, a port that provides connectivity with a portable memory in the form of Universal Serial Bus (USB) flash drive or standalone storage device, or the like. These hardware components may be at least partially encased in a housing 270, which is made entirely or partially of a rigid material (e.g., hardened plastic, metal, glass, composite, or any combination thereof) that protects these components from atmospheric conditions.

Referring still to FIG. 2, the memory 220 may include a plurality of memory locations that are addressable by the hardware processor 210 (and/or the network interface controller $250_1$), including the controller 240. As optional logic, especially where the intermediary network device 160 is not utilized, the memory 220 may include static analysis logic 295. When deployed, the static analysis logic 295 includes one or more software modules that, when executed by the hardware processor 210, analyzes features for an incoming object 130 (or metadata associated with the object 130). According to one embodiment of the disclosure, this analysis may be directed to features of the object 130 to determine whether the object 130 is "suspicious," namely there exists a certain level of likelihood that the object 130 is associated with a cyberattack that is determined without execution of the object 130 that constitutes in-depth behavioral analysis of the object 130 by the VM(s) $150_1$-$150_N$ to be conducted. The static analysis logic 295 may perform one or more checks being conducted on the object 130 (or its corresponding metadata 257) as described in connection with the operations of the intermediary network device 160.

Figure 3:
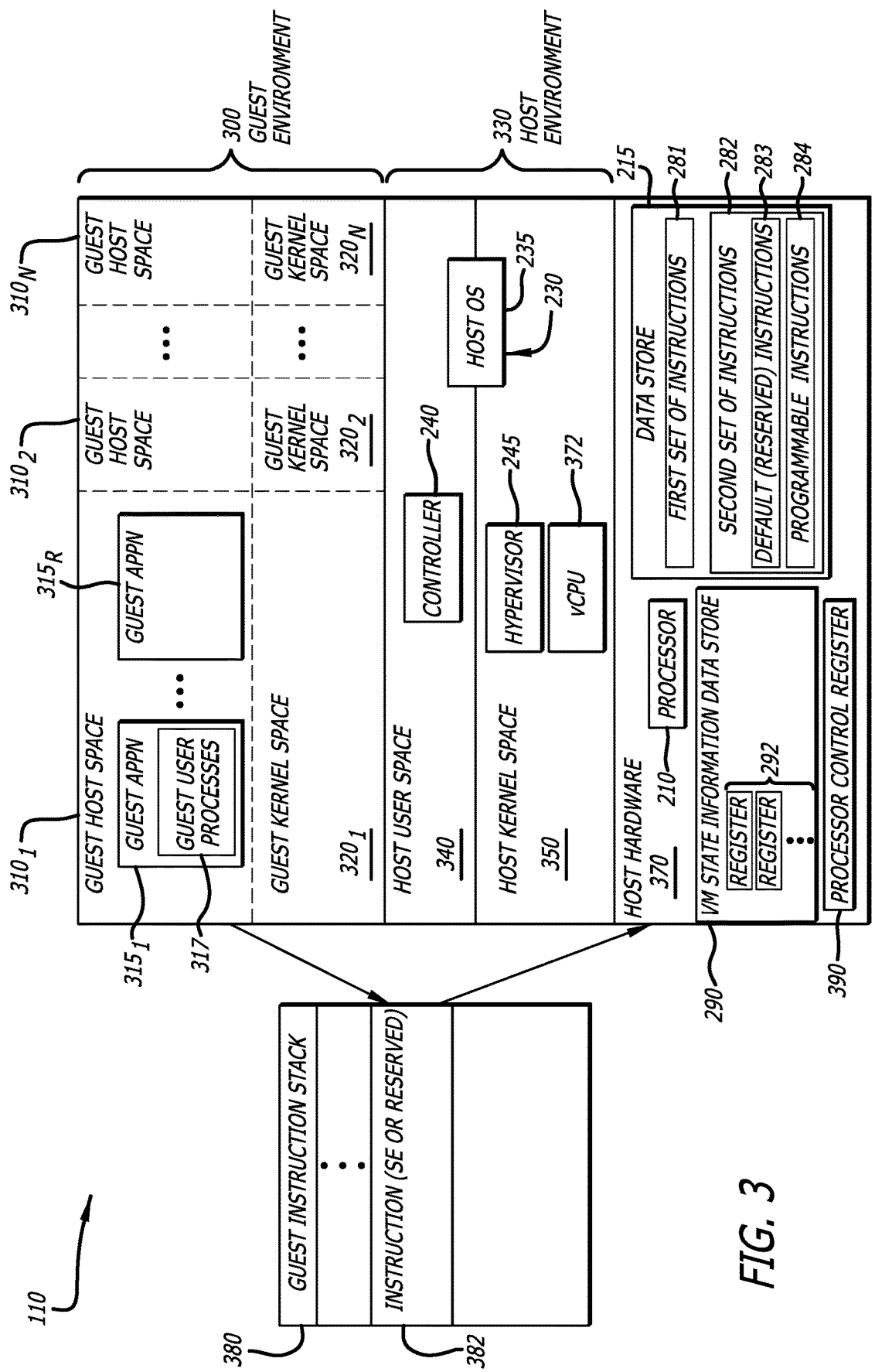
FIG. 3 is an exemplary block diagram of a logical representation of the operability of a controller deployed within the network device of FIG. 2 that, under certain conditions, seizes control in the processing of a current instruction that may include speculative execution.

Herein, the virtualization logic 140 includes (a) one or more VMs $150_1$-$150_N$, which are provisioned with a selected software profile to process the object 130, and (b) the hypervisor 245 that controls provisioning of the VM(s) $150_1$-$150_N$. In one embodiment of the disclosure, each VM $150_1$ . . . , or $150_N$ operates as a virtualized network device, including a logical architecture featuring a guest environment 300 and a host environment 330 as illustrated in FIG. 3 and described below. Additionally, the virtualization logic 140 includes a controller 240, operating in the user host space and configured for communications with the hardware processor 210, to control the processing of a particular instruction (e.g., SE instruction and/or reserved instruction) in lieu of a guest user process that initiated execution of the particular instruction. The reassignment of processing control occurs unbeknownst to the guest user process operating in a VM (e.g., VM $150_1$). The controller 240 controls such processing and maintains state information associated with the VM $150_1$ during processing of the particular instruction including updating the instruction pointer to the next instruction in the guest instruction stack (described below). Upon completion of the processing of the particular instruction, the controller 240 saves the VM state information, returns both the VM state information and processing control back to the guest user process operating in the VM $150_1$.

Implemented as load memory within the processor 210 or separate memory (e.g., part of memory 220 or dedicated memory separate from the memory 220), the data store 215 may include one or more sets of instructions. Upon detecting that an instruction from the set(s) of instructions is being processed by guest user process within the guest environment of a virtual machine (e.g., VM $150_1$), the hardware processor 210 provides the instruction to the controller 240 for processing, thereby reassigning control for processing of the instruction to the controller 240 within the virtualization logic 140. Herein, the data store 215 includes instructions 280, which may cause the processor 210 to transition process control from logic within the guest environment to logic within the host environment. The instructions 280 include a first set of instructions 281 (e.g., SE instructions) that causes the processor 210, in response to detecting an instruction from the first set of instructions 281 in a guest instruction stack, to (i) place the instruction into the host instruction stack for processing and (ii) obtain the state of a guest (e.g., a virtual machine). One type of SE instruction may include an instruction to access contents within a processor control register utilized for speculative execution, such as a model-specific register (MSR) for example. As access of the content of a MSR by a guest process is usual, and thus, the content of the MSR is not accurately provided. Rather, a substitute content is provided in efforts, from subsequent behaviors, to determine the context surrounding the potential malware that caused the guest process to attempt to access content from the MSR (e.g., type, family, intent, etc.).

Besides the first set of instructions 281, the data store 215 may further include a second set of instructions 282 (e.g., reserved instructions). The reserved instructions 282 may include (i) a first subset (i.e., one or more) of instructions 283 and (ii) a second subset of instructions of instructions) 284. For this embodiment, the first subset of instructions 283 (hereinafter, "default reserved instructions") are static (e.g., hardcoded) and solely permit exclusive interaction with the host due to the factors (e.g., privilege, importance to operation, etc.) that preclude the guest performing such operations. The second subset of instructions (programmable instructions) 284 are selected by the hypervisor at initialization and prior to transitioning of the processor from "host mode" to "guest mode" based on the desired control in operability of the network device. The programmable instructions are typically updated aperiodically, but may be configured to be updated in a periodic basis to address changes in the threat landscape where certain instructions may trigger the start of cyberattacks that contravene the user/kernel space separation or inter-process isolation.

Upon detecting one of the reserved instructions 282, the hardware processor 210 reassigns control in processing the reserved instruction 282 from a guest user process running on the VM $150_1$ to the controller 240, both being software components of the virtualization logic 140. Upon completion of the processing of the reserved instruction 282, the current state information associated with the VM $150_1$ is saved within a [VM] state information data store 290, which may be subsequently accessed by the controller 240 in processing of instructions 280 that requires a transition in control to the controller 240. The state information data store 290 is configured to maintain state information entries (e.g., registers) 292 associated with each of the VMs $150_1$-$150_N$.

According to one embodiment of the disclosure, as shown in FIG. 2, the classification logic 170 is configured to receive results from analyses of the object 130 within one or more of the VM(s) $150_1$-$150_N$. The VM-based results include information associated with the monitored behaviors associated with the object 130 and/or the VM(s) Based on the VM-based results, inclusive of detection of certain activity suggestive of maliciousness (e g attempted execution by a guest user process of a certain SE instruction or reserved instruction), the classification logic 170 classifies the object 130 as malicious or non-malicious. In response to the object 130 being deemed malicious, information associated with the malicious object 130 may be passed to the reporting logic 180. The reporting logic 180 is configured to generate an alert. An "alert" may include one or more messages that identify to a network administrator detection of a malicious object and a cyberattack (e.g., attacks that contravene the user/kernel space separation, attacks that contravene inter-process isolation, etc.). For messages, the message types may include text messages and/or email messages, video or audio stream, or other types of information over a wired or wireless communication path, as described above.

Referring still to FIG. 2, the processor 210 is a multipurpose, programmable device that accepts digital data as input, including one or more instructions from one or more instruction stacks accessible by the virtual machine $150_1$, determine whether any of the instructions constitutes a SE-instruction or a reserved instruction. If so, the processor 210 transitions control from the user guess process to the controller 240 operating in the host user space. One example of the processor 210 may include an Intel x86 central processing unit (CPU) with an instruction set architecture. Alternatively, the processor 210 may include another type of CPU, a digital signal processor (DSP), an application specific integrated circuit (ASIC), or the like. It is contemplated that, in lieu of processor 210, a virtual processor operating as part of the host kernel space of the virtualization logic 140 may monitor and adjust the transition of processing control between the guest user processes and the controller 240.

III. Exemplary Logical Layout

Referring to FIG. 3, an exemplary block diagram of a logical representation of the MDS 110 of FIGS. 1-2 including represented by the guest environment 300, the host environment 330 and a host hardware 370. The guest environment 300 includes the VMs $150_1$-$150_N$, each including a guest user spaces $310_1$-$310_N$ and a guest kernel space 320i-320N. The host environment 330 includes a host user space 340 and a host kernel space 350.

Each guest user space (e.g., guest user space $310_1$ of VM $150_1$) may include one or more instances of one or more guest applications $315_1$-$315_R$ (R≥1) running in their separate guest address spaces. Each of these guest application instances $315_1$-$315_R$ may include one or more guest user processes 317, which may operate serially or operate concurrently (i.e., at least partially overlapping in time) with each other. Depending on its type, the object 130 is processed by a particular guest application instance (e.g., guest application instance $315_1$) within the VM $150_1$ in which the guest user processes 317 collectively perform such processing of the object 130 (or information associated with the object 130). Examples of guest application instances $315_1$-$315_R$ may include a Portable Document Format (PDF) reader application that may include guest user processes directed to creating, viewing, printing, and/or editing (comments, highlight, etc.) a PDF document (object) or may include a data processing application instance to open, edit, and/or close a document (object).

According to this embodiment of the disclosure, the guest kernel space $320_1$ may include software components that may be configured to operate and support communications with software components within the host user space 340. For instance, as an illustrative example, the software components may include, but are not limited or restricted to one or more software drivers that operate to access virtual hardware components within the host user space 340. The controller 240 resides in the host user space 340.

The host kernel space 350 includes virtualization software such as a hypervisor 245 (sometimes referred to as a "virtual machine monitor" or "VMM"). In general, the hypervisor 245 controls initialization and operability of the one or more VMs $150_1$-$150_N$ operating within the MDS 110. According to one embodiment of the disclosure, the hypervisor 245 may be deployed as either (i) a "Type 1" (bare metal) hypervisor or (ii) a "Type 2" (hosted) hypervisor. In general, a hosted hypervisor runs as a software component that is installed on the host kernel OS 235 and supports one or more guest OSes operating in the guest kernel space 320. The hosted hypervisor relies on the host kernel OS 235 to handle hardware resource management. A bare metal hypervisor, on the other hand, runs directly on the host hardware 370 and operates completely independent from the host OS 355. Alternatively, however, as another embodiment of the disclosure, the hypervisor 245 may be implemented as a software component of the processor 210 being part of the host hardware 370.

Herein, the host hardware 370 includes the processor 210 of FIG. 2 with access to the data store 215. The data store 215 maintains instructions that cause the processor 210, in response to detecting any of these instructions is being requested by a guest user process 317 operating in the guest environment 300, to switch its operating mode from "guest mode" to "host" mode, where the processor 210 begins executing code associated with the controller 240 that is stored within the host user space 340. As a result, the processor 210 reassigns control in the processing from a current instruction 382 from the guest user process 317 operating within the guest user space 310 to the controller 240 operating in the host user space 340. Herein, the data store 215 includes the first set of instructions 281 (e.g., one or more SE instructions) and the second set of instructions 282 (e.g., one or more reserved instructions).

In response to receipt of a request by a guest user process (e.g., guest user process 317 operating within the virtual machines $150_1$) to execute the instruction 382 residing in a guest instruction stack 380, the processor 210 determines whether that instruction is an instruction from the first set of instructions 281 or the second set of instructions 282. For instance, one of the first set of instructions 281 may include an instruction to access contents within a processor control register 390 utilized for speculative execution. An example of a processor control register 390 for speculative execution includes a model-specific register (MSR). One of the second set of instructions 282 may include a "reserved" instruction, namely an instruction that may be used to alter the operability of the host hardware 370, such as the hardware processor 210 for example. The second set of instructions 282 may include (i) a first subset of instructions (default instructions) 283 and (ii) a second subset of instructions (programmable instructions) 284, which may be selected by security administrators handling operability of the MDS 110 and may be updated frequently (periodically or aperiodically) in light of the prevailing threat landscape when the processor 210 is operating in "host" mode.

If the instruction 382 is not part of the first set of instructions 281 or the second set of instructions 282, the processor remains in "guest" mode where the guest user process 317 continues to control processing of the instruction 382 and retains operational control of the network device and its resources. In contrast, if the instruction 382 is a SE instruction, the processor 210 reassigns control in execution of the SE instruction 382 to the controller 240 located in the host user space 340. At this time, the MDS 110 is considered to be operating in "host" mode. In host mode, the controller 240 has access to the instruction 382 for processing. Additionally, the controller 240 receives a stored current state of the guest (VM $150_1$) from the state information data store 290. Based on the received SE instruction 382 and the stored current state of the VM $150_1$, the controller 240 emulates processing of the SE instruction 382 and determines the state information to be returned to the guest (e.g., VM $150_1$).

For example, according to one embodiment of the disclosure, the controller 240 may emulate processing of the SE instruction 382, which alter content within a data structure associated with a virtual processor (vCPU) 372 residing in the host environment 330 (e.g., host kernel space 350) in lieu of modifying the contents of the processor control register 390. The actual contents of the processor control register 390 remain unchanged. Upon completion of the processing of the SE instruction 382, the contents within the data structure of the vCPU 372 may be provided to the processor 210 to be returned to the guest user process of the VM $150_1$ initiating the SE instruction 382. By limiting speculative execution being handled by software components within the host environment 330 in response to instructions that cause speculative execution to occur being executed within the guest environment 300, while appearing, to the VM $150_1$, that speculative execution is enabled, the MDS 110 of FIG. 1 may detect malware which exploits a vulnerability associated with the processor 210 and/or its functionality without compromising security of the processor 210. The behavior (event) associated with the attempted execution is stored in an event log that may be accessible by the classification logic 170 within the MDS 110 of FIG. 1 for comparison with known benign and malicious behaviors (event) to determine whether an object is malicious.

If the instruction 382 is a reserved instruction, the processor 210 reassigns control in processing of the reserved instruction to the controller 240 located in the host user space 340. As described above, the controller 240 receives the reserved instruction and the current state of the guest (VM $150_1$). Based on the reserved instruction and the current state of the VM $150_1$, the controller 240 emulates processing of the reserved instruction 382 and determines what state information is to be returned to the guest (e.g., VM $150_1$). Herein, the state information returned to the guest user process 317 by the controller 240 may cause the VM $150_1$ to conclude that it is operating in a different state than the actual state of the network device (MDS) 110. The state information associated with the VM $150_1$ is retained for subsequent operations directed to the guest user process 317 initiating the reserved instruction 382. In this way, the guest user process executing the object continues to permit monitoring of further activities associated with the object, which may be relevant in determining whether a cyberattack is occurring. Additionally, where a cyberattack is occurring, the further activities may assist in the understanding of the nature and intent of the cyberattack.

Figure 4:
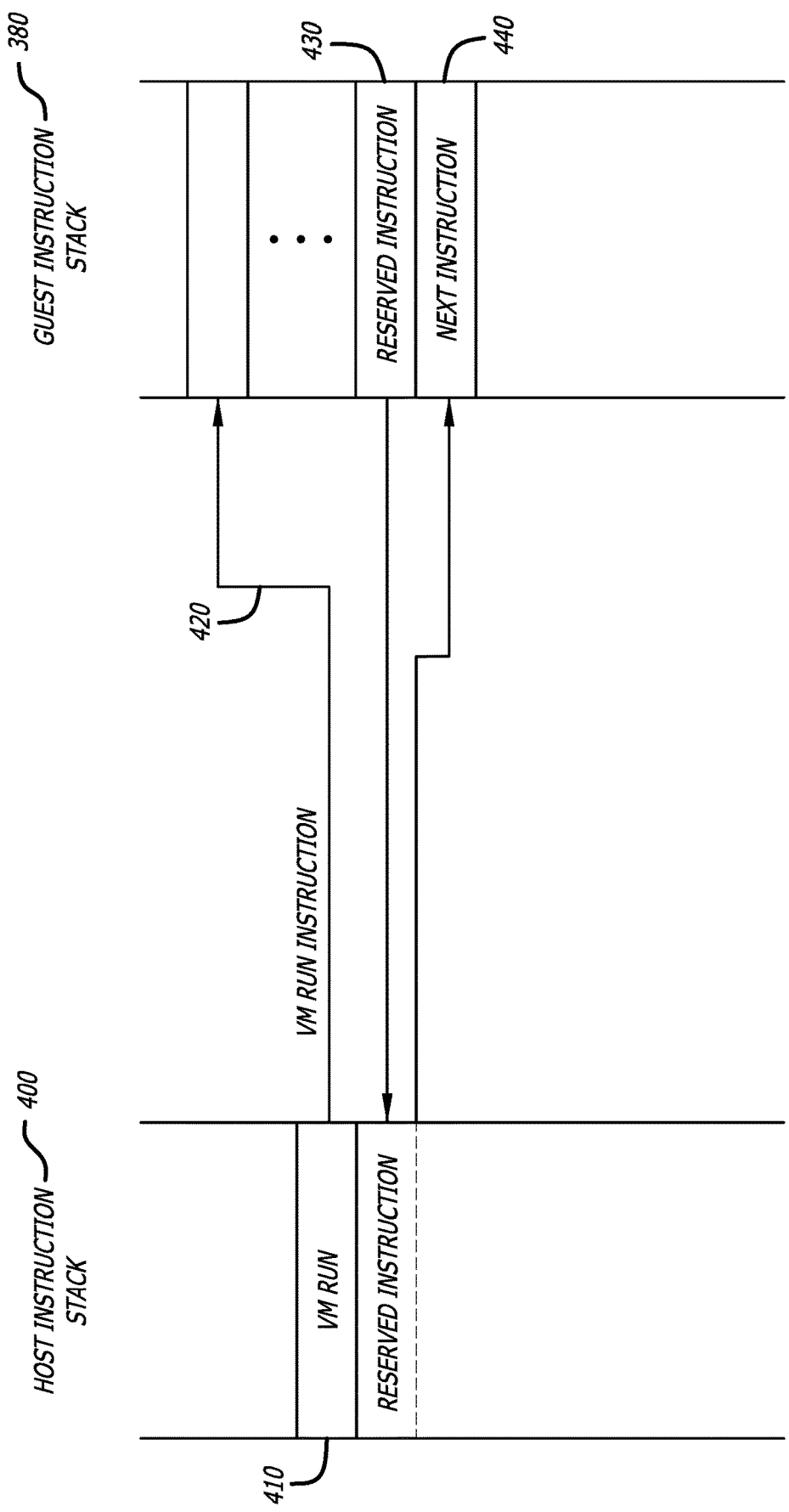
FIG. 4 is an exemplary embodiment of a logical representation of the interaction between the host instruction stack and the guest instruction stack being processed by a virtual machine operating in the guest environment and a controller operating in the host environment of the malware detection system of FIG. 1.

Referring now to FIG. 4, an exemplary embodiment of a logical representation of the interaction between a host instruction stack 400 and the guest instruction stack 380 representing instructions to be processed by a virtual machine or a controller operating within the host user space 340 is shown. The host instruction stack 400 includes a VM run instruction 410, which may load an instruction 420 into the guest instruction stack 380 that either initializes a designated virtual machine (e.g., VM $150_1$) or requests the VM $150_1$ to retrieve current state information and resume operations from a current operating state of the VM $150_1$. One or more guest user processes of the VM $150_1$, in performing VM-based operations, may load instructions into the guest instruction stack 380 that are processed by a processor in an accordance with a selected stack protocol (e.g., first-in, first-out "FIFO" protocol).

In response to detecting an instruction 430 during processing by the (virtual) processor of an instruction from the first set of instructions 281 or from the second set of instructions 282 (e.g., reserved instruction 430), the reserved instruction 430 is loaded into the host instruction stack 400 for processing by the controller 240 of FIG. 3. Additionally, a current state 440 associated with the VM $150_1$ is retrieved from the state information data store 290 for use in processing of the reserved instruction 430. Where the instruction 430 is a "reserved" instruction as illustrated (or a SE instruction), the controller 240 (see FIGS. 2-3) may control performance of the operations resulting from execution of the instruction 430. Additionally, the controller 240 receives a stored current state of the guest (VM). Based on the received SE instruction and the stored current state of the VM, the controller 240 determines what information to return to the guest (e.g., virtual machine), where the information includes a pointer to the next instruction 440 in the guest instruction stack 380. Of course, if the instruction 430 is other than the SE instruction and/or the reserved instruction, the guest user process of the VM $150_1$ retains operational control of the network device and its resources based on a lack of usage of the host instruction stack 400 for such instruction 430.

Figure 5:
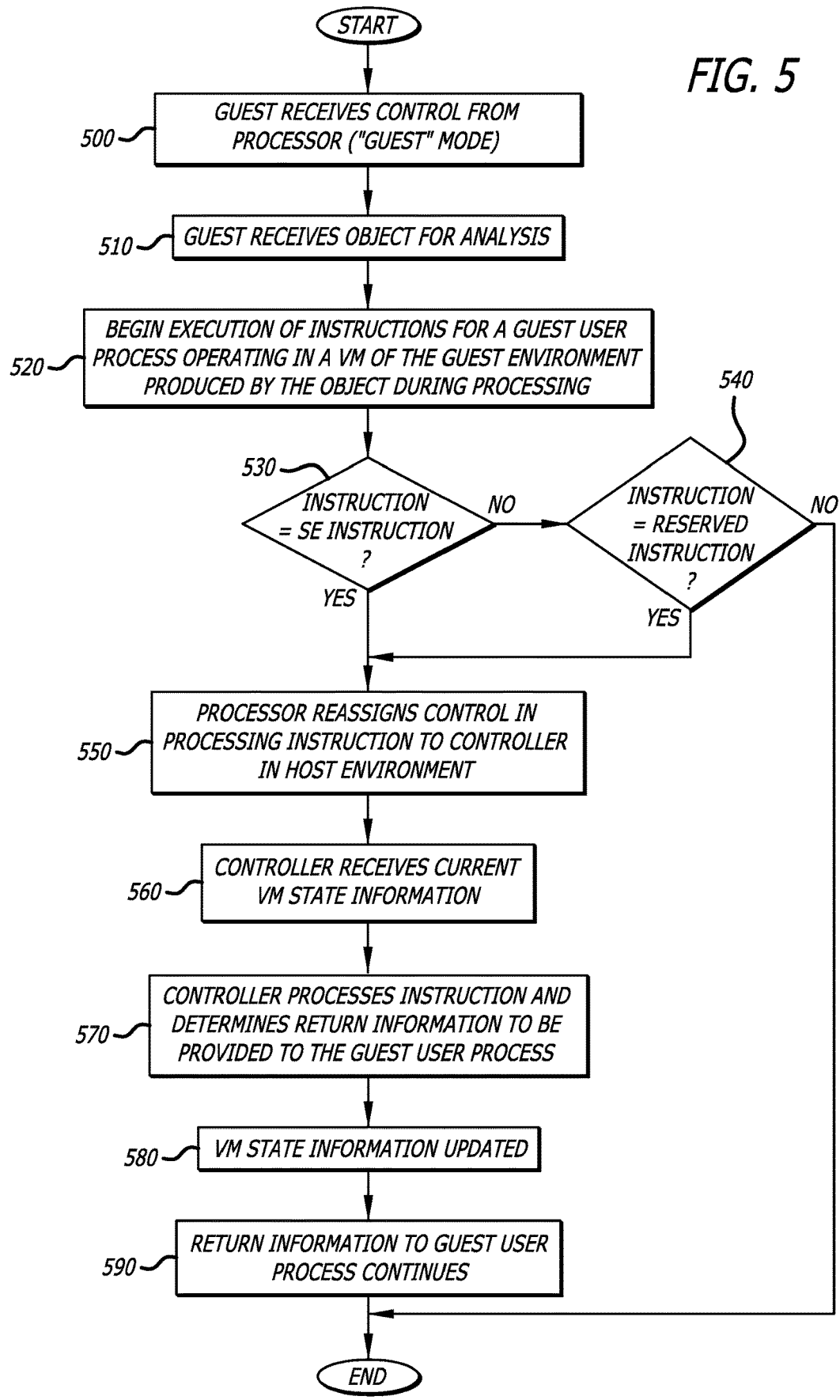
FIG. 5 is an illustrative embodiment of the operations conducted by the virtual machine and controller of FIG. 3 operating as part of the malware detection system of FIG. 1.

Referring to FIG. 5, an illustrative embodiment of the operations conducted by one or more virtual machines (e.g., VM $150_1$) and the controller 240 of FIG. 2-3 operating as part of the malware detection system of FIG. 1 is shown. Herein, a guest (e.g., VM $150_1$) receives control from the processor, where the processor is operating in "guest" mode (operation 500). Thereafter, the guest receives an object for analysis (operation 510), and during analysis of the object, the guest may attempt to execute at least a SE instruction (e.g., one of the first set of instructions 281 causes or leads us to a speculative execution task) or a "reserved" instruction (e.g., one of the second set of instructions 282), being one of a plurality of instructions selected by a security administrator to be solely conducted by a process operating with the host environment 330 of FIG. 3 (operation 520).

In response to the instruction being executed corresponds to a SE-instruction or a reserved instruction, the host receives processor control and a current instruction state of the guest (operations 530-560). The host determines, based on the guest state, the type of information expected to be returned to the guest (operation 570). Thereafter, the host modifies a storage entry associated within the current state of the guest, and returns processor control to the guest (operation 580). The guest resumes processing instructions with the guest instruction stack without knowledge that control of the processing of the instruction (SE-instruction or reserved instruction) was temporarily lost to the host (e.g., controller 240 operating in the host user space as shown in FIGS. 2-3).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method comprising:
   detecting whether a guest process, performed by a virtual machine operating within a network device, is performing an activity associated with a potential cyberattack by at least identifying that an instruction being executed by the guest process corresponds to an instruction associated with a speculative execution task; and
   responsive to the guest process performing the activity associated with the potential cyberattack,
      transferring control from the guest process to a host process operating within the network device without the guest process having knowledge that control in the performing of the activity was temporarily lost to the host process, the transferring control comprises reassigning performance of the activity to be conducted by the host process based on movement of the instruction from a guest instruction stack to a host instruction stack, and
      determining what information is to be returned to the virtual machine to avoid detection that the virtual machine is operating in a state different than an actual state of the network device.

2. The computerized method of claim 1, wherein
   the determining what information is to be returned to the virtual machine comprises determining what information is to be returned to the guest process.

3. The computerized method of claim 2, wherein the instruction associated with the speculative execution task includes an instruction to access content stored within a specific register accessible by the processor for re-storage into one or more input/output (I/O) addresses within a memory of the network device.

4. The computerized method of claim 2, wherein the detecting whether the guest process is performing the activity associated with the potential cyberattack further comprises identifying, by the processor of the network device, whether the instruction being processed by the guest process corresponds to an instruction associated with an instruction selectively reserved for processing by the host process.

5. The computerized method of claim 1, wherein the reassigning of the performance of the activity to be conducted by the host process includes reassigning an instruction being processed by the guest process to be processed by a controller maintained within a host user space of the network device.

6. The computerized method of claim 5, wherein the reassigning of the performance of the activity to be conducted by the host process further includes the controller emulating processing of the instruction and returning results of the emulated processing of the instruction to the guest process.

7. The computerized method of claim 6, wherein the results of the emulated processing of the instruction are stored in a data structure of a virtual processor that is made available to the processor for return to the virtual machine running the guest process.

8. The computerized method of claim 5 further comprising:
   classifying an object executed in the virtual machine as malicious upon detecting an attempt by the guest process in executing the instruction causing or leading to performance of the speculative execution task that is to be handled by one or more processes within a host environment including the host user space.

9. The computerized method of claim 8 further comprising:
   responsive to classifying the object as malicious, issuing an alert that (i) identifies a cyberattack is occurring and information associated with the object deemed to be malicious or (ii) alters displayable content to highlight that the object is malicious.

10. A non-transitory storage medium including logic that, when executed by a processor of a network device, performs operations comprising:
    detecting whether a first software component, operating within a virtual machine deployed within a guest environment of the network device, is attempting to execute an instruction associated with a speculative execution task;
    disabling the speculative execution task from being performed by the first software component without the virtual machine detecting that speculative execution by the first software component has been disabled;
    transferring control from a first process associated with the first software component to a second process associated with a second software component operating within a host environment of the network device by at least reassigning execution of the instruction to be conducted by the second process based on movement of the instruction from a guest instruction stack to a host instruction stack; and
    based on the instruction associated with the speculative execution task and a stored current state of the virtual machine, determining what information to return to the guest process to avoid detection that the virtual machine is operating in a state different than an actual state of the network device, wherein the information including at least a pointer to a next instruction in a guest instruction stack.

11. The non-transitory storage medium of claim 10, wherein the disabling of the speculative execution task comprises reassigning performance of the speculative execution task to a second software component operating within a host environment of the network device.

12. The non-transitory storage medium of claim 10, wherein the instruction associated with the speculative execution task includes an instruction to access content within a specific register accessible by the processor to be stored into an input/output (I/O) address within a memory that is accessible by the first software component.

13. The non-transitory storage medium of claim 10, wherein the detecting whether the first software component is attempting to execute the instruction associated with the speculative execution task comprises:
    detecting whether the first software component is attempting to execute a second instruction selectively reserved for processing by the host process operating within the host environment of the network device.

14. The non-transitory storage medium of claim 10, wherein the reassigning of the processing of the instruction associated with the speculative execution task comprises reassigning the instruction associated with the speculative execution task to be processed by a controller being the host process maintained within a host user space within the host environment.

15. The non-transitory storage medium of claim 14, wherein the reassigning of the instruction associated with the speculative execution task to be processed by the controller comprises the controller emulating processing of the instruction associated with the speculative execution task and returning results of the emulated processing of the instruction associated with the speculative execution task to the first software component.

16. The non-transitory storage medium of claim 15, wherein the results of the emulated processing of the instruction associated with the speculative execution task are stored in a data structure of a virtual processor that is made available to the processor for return to the virtual machine running the first software component.

17. A network device comprising:
  a processor; and
  a non-transitory storage medium communicatively coupled to the processor, the non-transitory storage medium including (i) a first software component that, when executed by the processor, controls execution of an object in determining whether the object is malicious, and (ii) a second software component that, when executed by the processor, is configured to (a) detect whether a process initiated from execution of the object, is attempting to execute an instruction selectively reserved for processing by a host process within a host environment of the network device to perform a task being a speculative execution task, and (b) disable the speculative execution task from being performed by the process without the first software component detecting that the process has been disabled, (c) transfer control from the process to the host process by at least reassigning performance of the speculative execution task to the host process operating within the host environment based on movement of the instruction from a guest instruction stack to a host instruction stack, and (d) determine what information is to be returned to the process to avoid detection that the first software component is operating outside of a guest mode.

18. The network device of claim 17, wherein the non-transitory storage medium further comprises a third software component that, when executed by the processor, is configured to (i) detect whether the process initiated from execution of the object, is attempting to execute a second instruction selectively reserved for processing by a host process operating within the host environment of the network device, and (ii) reassign processing of the second instruction by a host process in lieu of the process.

19. The network device of claim 17, wherein the reassigning of the performance of the speculation execution task being a factor in classifying the object as malicious or benign.

20. The network device of claim 17, wherein the instruction selectively reserved for processing by the host process includes an instruction to access content stored within a specific register accessible by the processor for storage within a memory of the network device.

21. The network device of claim 17, wherein the second component is further configured to classify the object as malicious upon detecting an attempt by the guest process in executing the instruction causing or leading to performance of the speculative execution task that is to be handled by the host process.

22. The network device of claim 17, wherein the second component is further configured to issue an alert, responsive to classifying the object as malicious, (i) identifying a cyberattack is occurring and information associated with the object deemed to be malicious or (ii) altering displayable content to highlight that the object is malicious.

* * * * *